United States Patent
Bronswick et al.

(10) Patent No.: US 10,807,429 B2
(45) Date of Patent: Oct. 20, 2020

(54) METHOD FOR PRODUCING A COMPONENT

(71) Applicant: ZF Friedrichshafen AG, Friedrichshafen (DE)

(72) Inventors: Philipp Bronswick, Ostercappeln (DE); Sven Kuhlmann, Lemförde (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 101 days.

(21) Appl. No.: 16/067,970

(22) PCT Filed: Dec. 19, 2016

(86) PCT No.: PCT/EP2016/081663
§ 371 (c)(1),
(2) Date: Jul. 3, 2018

(87) PCT Pub. No.: WO2017/129320
PCT Pub. Date: Aug. 3, 2017

(65) Prior Publication Data
US 2019/0009627 A1  Jan. 10, 2019

(30) Foreign Application Priority Data

Jan. 26, 2016 (DE) .................... 10 2016 201 036

(51) Int. Cl.
*B60G 7/00* (2006.01)
*C21D 7/02* (2006.01)
(Continued)

(52) U.S. Cl.
CPC ................ B60G 7/001 (2013.01); B32B 7/12 (2013.01); B32B 15/08 (2013.01); B32B 15/18 (2013.01);
(Continued)

(58) Field of Classification Search
None
See application file for complete search history.

(56) References Cited

U.S. PATENT DOCUMENTS

| 8,256,828 B2 | 9/2012 | Carle et al. |
| 8,967,703 B2 | 3/2015 | Wawers |

(Continued)

FOREIGN PATENT DOCUMENTS

| DE | 10 2006 060 897 A1 | 6/2008 |
| DE | 10 2007 018 459 A1 | 10/2008 |

(Continued)

OTHER PUBLICATIONS

Steinhoff K. et al., "Verbessertes Festigkeits-/Dehnungs—Verhältnis durch modifizierte Wärmebehandlung hochfester Vergütungsstähle vom Typ 22MnB5", Neuere Entwicklungen in der Blechumformung: Vortragstexte Zurveranstaltung Internationale Konferenz, X, XX, May 9, 2006, pp. 185-206.

(Continued)

*Primary Examiner* — Barbara J Musser
(74) *Attorney, Agent, or Firm* — Davis & Bujold PLLC; Michael J. Bujold

(57) ABSTRACT

In order to reduce both the weight and the production costs in the case of vehicle chassis components consisting of at least two parts, a first part is made as a sheet component by press hardening and the second part is produced by a conventional production method, which does not include press hardening. The part produced by press hardening forms a structural component, whereas the other component serves to stiffen the part produced by press hardening.

8 Claims, 1 Drawing Sheet

(51) Int. Cl.
*C21D 1/673* (2006.01)
*B32B 7/12* (2006.01)
*B32B 15/08* (2006.01)
*B32B 15/18* (2006.01)

(52) U.S. Cl.
CPC ............... *C21D 1/673* (2013.01); *C21D 7/02* (2013.01); *B32B 2262/106* (2013.01); *B32B 2605/00* (2013.01); *B60G 2206/124* (2013.01); *B60G 2206/14* (2013.01); *B60G 2206/722* (2013.01); *B60G 2206/8102* (2013.01); *B60G 2206/821* (2013.01)

(56) References Cited

U.S. PATENT DOCUMENTS

| | | | | |
|---|---|---|---|---|
| 2008/0000883 | A1* | 1/2008 | Rudolf | B23K 9/167 219/121.64 |
| 2012/0040205 | A1 | 2/2012 | Lenze et al. | |
| 2012/0319432 | A1* | 12/2012 | Bodin | B62D 29/007 296/203.03 |
| 2013/0052392 | A1 | 2/2013 | Radlmayr et al. | |
| 2013/0106138 | A1* | 5/2013 | Brockhoff | B29C 70/028 296/187.03 |
| 2017/0073017 | A1* | 3/2017 | Steffens | B62D 29/005 |

FOREIGN PATENT DOCUMENTS

| | | |
|---|---|---|
| DE | 10 2009 020 423 A1 | 11/2010 |
| DE | 20 2010 002 099 U1 | 7/2011 |
| DE | 10 2011 007 831 A1 | 10/2012 |
| DE | 10 2011 120 519 A1 | 6/2013 |
| DE | 10 2012 100 786 A1 | 8/2013 |
| WO | 2010/094538 A1 | 8/2010 |

OTHER PUBLICATIONS

German Office Action Corresponding to 10 2016 201 036.0 dated Dec. 2, 2016.
International Search Report Corresponding to PCT/EP2016/081663 dated Apr. 28, 2017.
Written Opinion Corresponding to PCT/EP2016/081663 dated Apr. 28, 2017.

* cited by examiner

METHOD FOR PRODUCING A COMPONENT

This application is a National Stage completion of PCT/EP2016/081663 filed Dec. 19, 2016, which claims priority from German patent application serial no. 10 2016 201 036.0 filed Jan. 26, 2016.

FIELD OF THE INVENTION

The invention relates to a method for producing a component that consists of at least two individual parts which are connected to one another, in particular chassis components for motor vehicles, wherein one of the individual parts is a sheet metal component and is produced by press hardening. The invention also relates to a component produced by the method.

BACKGROUND OF THE INVENTION

Numerous measures are known for reducing the fuel consumption of motor vehicles. One of these measures is to make the components used as light as possible. On the one hand light materials such as aluminum are used, although the components made from it have to be reinforced if they are to withstand high loads or torques. On the other hand, to an increasing extent high-strength material are used in motor vehicle bodies at points which are particularly relevant for deformation. However, such materials are difficult to deform. As a rule components made from them are produced by press hardening. Press hardening or mold hardening is a process in which both shaping without machining and the heat treatment of the sheet metal component are combined in one process step. During this a plate heated to above the austenitizing temperature is placed into a cooled forming die and then quenched. This produced a martensitic structure with a very high tensile strength.

From DE 10 2006 060 897 B4 it is known to produce chassis components of motor vehicles, in particular cross members and transverse control arms of front axle assemblies, as a single press-hardened component. In order to achieve the desired strength properties, the hardness level is different in different parts of the component.

The chassis components produced in that way are on the one hand very costly. On the other hand, as a rule the rigidity required is not as a rule achieved with a one-piece component.

From DE 10 2009 020 423 A1 it is known to produce chassis components of motor vehicles from at least two sheet metal components, which are welded together. The sheet metal components are produced from high-strength materials by press hardening. To avoid cracks forming from the weld seam, in this case it is proposed not to harden the area of the weld seam in the two components. For this, during the production of the components these areas of the subsequent weld seam have to be exempted from any increase of strength and/or hardness. In production technology terms this is both expensive and time-consuming.

SUMMARY OF THE INVENTION

The purpose of the present invention is to simplify the production of a component consisting of at least two individual parts connected to one another, in particular a chassis component for motor vehicles.

This objective is achieved by the features specified in the characterizing portion of the independent claims. The features specified in the independent claims describe a component produced by the method according to the invention. Design features are described in the dependent claims, which in each case represent an aspect of the invention that can stand alone or be combined with others in various ways.

The invention is based on the recognition that the production costs can be reduced further if only one of the two individual parts is made by press hardening while the other individual part is produced in some other way, without press hardening. Then, it is only necessary for one individual part to have the required high strength/hardness, whereas the other individual part can be produced by other means without press hardening. Despite this, the component as a whole can be designed such that the required rejection mechanisms (buckling force window, onset of plastic deformation from the overall vehicle requirements for use in vehicles, damage chain and crash performance) are achieved by press hardening, if necessary by partial, varied hardening during the press hardening process. Depending on the production parameters during press hardening, the press-hardened individual part can if necessary have different strengths and ductilities. It is also possible to use material of varying thicknesses. Since press hardening enables the individual part to be produced dimensionally accurately, as a rule no finishing work is needed.

Thanks to the invention, the weight of the component can be reduced at the same time as achieving a rigid and strong structure. Moreover the production time is made shorter since only one individual part is made by press hardening. Furthermore, joining operations and individual components can be avoided, because the higher deformation flexibility of the non-press-hardened individual part can be used to advantage.

A possible way to produce the other individual part is to make it from sheet steel and cold-form it conventionally. In this case it can even be formed in more than one stage and can then also comprise holding elements for the fitting of further structural components such as rubber mountings.

If both individual parts are made from sheet steel, then a suitable joining method is welding. This is a simple, tried and tested joining method which satisfies all the requirements for the component as a whole. The welding method used can be MIG, MAG or laser welding.

To avoid crack formation starting from the weld seam area in the press-hardened individual part it is best, during press hardening, for the weld seam area to have lower strength and/or hardness than the press-hardened area.

Instead of a sheet metal component as the other individual part a fiber-reinforced component, in particular a carbon-fiber-reinforced plastic component can be used. This further reduces the weight of the component as a whole without adverse effect on its strength.

Instead of welding, the individual parts can also be adhesively bonded to one another. This is particularly appropriate when the other individual part is a plastic component.

It is appropriate to choose as the first individual part formed by press hardening that individual part which, when the component as a whole is in service, is exposed to the forces/torques acting and to choose as the other individual part the individual part which serves primarily to stiffen the component as a whole. The latter is then preferably made by conventional cold-forming.

Alternatively, the primary individual part that serves to reinforce can be made of fiber-reinforced plastic, and it is then given its shape directly during its production from fibers and a matrix.

The method according to the invention is particularly well suited for the production of structural chassis components. Then for example, in the case of a wheel-guiding structural chassis component, the component as a whole is divided in such manner that part of the structural component is press hardened in order to achieve high strength at the same time as low weight. The other individual part then serves primarily to strengthen the component as a whole. In this case too holding elements for the fitting of further added components such as rubber mountings can be provided.

The invention is not limited to the indicated combinations of features in the independent claim with those in the claims that depend on it. There are also further options for combining individual features with one another, particularly when they emerge from the claims, the description of example embodiments given below, or directly from the figures. Furthermore, references in the claims to the figures by the use of indexes are in no case intended to restrict the protective scope of the claims to the example embodiments illustrated.

BRIEF DESCRIPTION OF THE DRAWINGS

To explain the invention further, reference is made to the drawings in which two preferred example embodiments are illustrated in simplified form. The figures show.

DETAILED DESCRIPTION OF THE PREFERRED EMBODIMENTS

Figure 1:
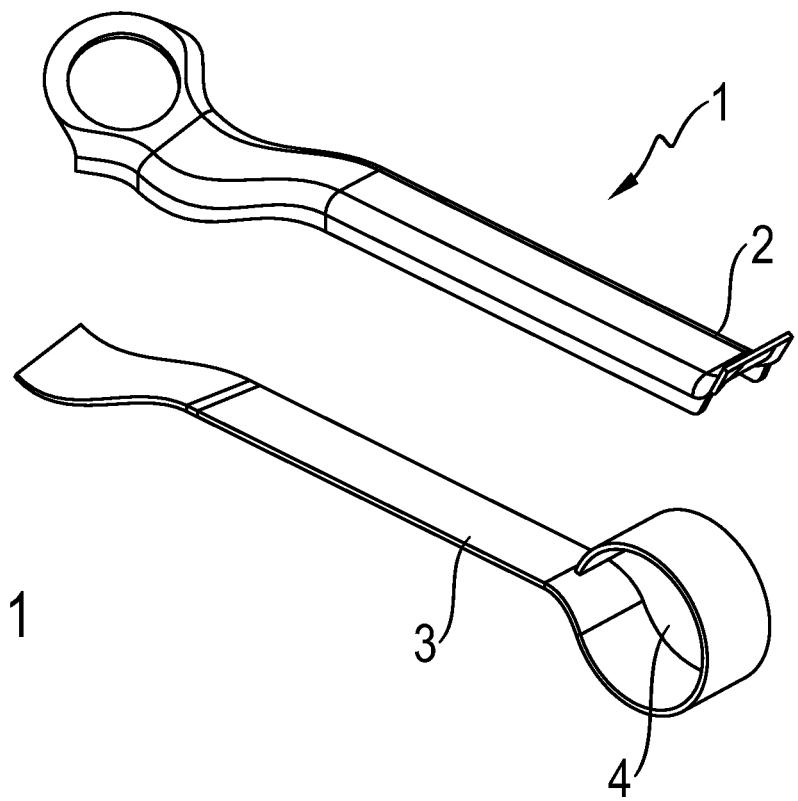
FIG. 1: A perspective view of a longitudinal member for a motor vehicle, which consists of a first, press-hardened individual part and a second, cold-formed individual part that serves as reinforcement.

The longitudinal member 1 for a motor vehicle shown in FIG. 1 consists of the two individual parts 2 and 3, the individual part 2 being a structural component and the individual part 3 functioning as a reinforcing component.

The individual part 2 is made by press hardening from a hardened steel such as 22MnB5. To achieve production in as geometrically simple a manner as possible during press hardening, this individual part 2 is bent into a U-shaped cross-section and is therefore open downward. It has a longitudinally slightly angled extension. At its front end an opening is provided for receiving a fitted component, for example a ball head. The back end is bent slightly upward.

Press hardening or mold hardening is a method in which, in one process step, both the shaping of a sheet component without machining and its heat treatment are combined. For this the sheet blank heated to above the austenitizing temperature is placed in a cooled deformation die and then quenched. This produces a martensitic structure with very high tensile strength.

The individual part 3 is produced by conventional cold forming from a suitable steel sheet, and essentially follows the contour of the individual part 2. For this a number of shaping steps may be needed, which can be carried out without problems during cold forming. Thus, without problems a necessary mounting point 4 can also be integrated, which in this case is produced by rolling-in a free end of the individual part 3. In addition the mounting point 4 supports the slightly upward-bent back end of the individual part 2.

The two individual parts 2 and 3 are connected to form a profile with a closed cross-section by a weld joint, for example by spot welding, step welding or a continuous seam. When welding a press-hardened component it must be kept in mind that under high dynamic loading, starting from the weld joint cracks can form which can lead to failure of the component. To avoid this, the area of the weld joint on the press-hardened component should be exempted from hardening during its production.

Figure 2:
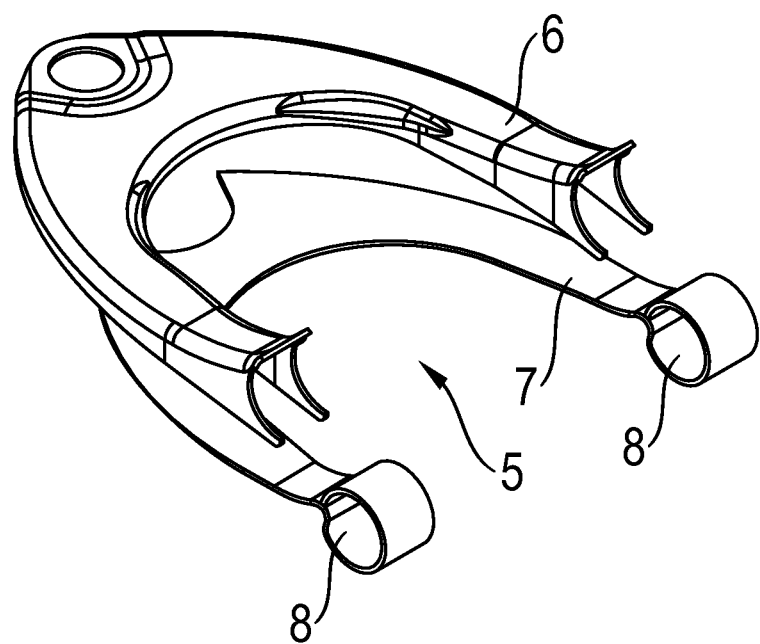
FIG. 2: A perspective view of a transverse fink for a motor vehicle, which consists of a first, press-hardened individual part and a second, cold-formed individual part that serves as reinforcement.

FIG. 2 shows a transverse link of a motor vehicle as the second example. This transverse link 5 also consists of two individual parts 6 and 7, namely the structural component 6 and the reinforcing component 7.

The structural component 6 is again made by press hardening from a hardenable steel, preferably 22MnB5. It has a contour as geometrically simple as possible, in that it has a U-shaped cross-section so that it can be produced in a pressing process. In its forward area it has an opening to receive a fitted component, for example an axle journal.

To form a profile with a closed cross-section, this transverse link 5 is connected to the second individual part 7 which closes off the U-shaped profile from below. Again, the individual part 7 can be made by cold forming from a suitable steel sheet. It includes the necessary mounting points 8, which can be produced by a multi-step deformation process. The mounting points 8 are supported against jaw-shaped openings in the structural component 6, in order to produce greater stability of shape during operation.

In this case too welding can be considered for the joining method, and in that case the special features explained above for the press-hardened component should be borne in mind.

Instead of a second individual part made of steel sheet, some other material can also be chosen. For example it is conceivable to make that component of carbon-fiber-reinforced plastic, which is then adhesively bonded to the first individual part. This has the advantage that besides a further reduction in weight, the problems associated with welding a press-hardened component are avoided. Thus, the production costs of the press-hardened component are reduced.

INDEXES

1 Longitudinal member
2 Individual part of 1
2 Individual part of 1
4 Mounting point on 3
5 Transverse link
6 Structural component of 5
7 Reinforcing component of 5
8 Mounting points on 7

The invention claimed is:

1. A method of producing a component for a motor vehicle that comprises at least first and second individual parts which are connected to one another, the method comprising:
producing the first individual part, which is a sheet metal part, by press hardening in a non-machining deformation process,
providing a front end of the first individual part with an opening in which a fitted component is receivable,
producing the second individual part by a production process without press hardening,
producing at least one mounting point in a free end of the second individual part in which a further structural component is receivable, and
fixing the first and the second individual parts to each other such that the opening of the first individual part is located at one end of the component for the motor vehicle and the at least one mounting point of the second individual part is located at an opposite end of the component for the motor vehicle, producing jaw-shaped openings in a back end of the first individual part, and adhesively bonding the first and the second individual parts to one another such that the at least one mounting point of the second individual part is supported by the jaw-shaped openings in the back end of the first individual part.

2. The method according to claim 1, further comprising producing the second individual part as a carbon-fiber-reinforced plastic part.

3. The method according to claim 1, further comprising producing the first individual part which when the component is in service, will be substantially subjected to force/torque that occur, as the press-hardened sheet metal part, and producing the second individual part, which serves primarily to stiffen the component as a whole, by the cold-forming process, and fixing the first and the second individual parts to each other such that the component is formed as either a longitudinal member or a transverse link of a motor vehicle.

4. The method according to claim 1, further comprising producing the first individual part, as the press-hardened sheet metal part, which, when the component is in service, will be substantially subjected to force/torque that occur and producing the second individual part, as a carbon-fiber-reinforced plastic part, which serves primarily to stiffen the component as a whole.

5. A method of producing a component for a motor vehicle that comprises at least first and second individual parts which are connected to one another, the method comprising:

producing the first individual part, which is a sheet metal part, by press hardening in a non-machining deformation process, providing a front end of the first individual part with an opening in which a fitted component is receivable, producing the second individual part by a production process without press hardening, producing at least one mounting point in a free end of the second individual part in which a further structural component is receivable, fixing the first and the second individual parts to each other such that the opening of the first individual part is located at one end of the component for the motor vehicle and the at least one mounting point of the second individual part is located at an opposite end of the component for the motor vehicle, producing the second individual part, which is a sheet metal part, by a sheet cold-forming process, and producing the at least one mounting point by rolling-in the free end of the second individual part.

6. The method according to claim 5, further comprising forming a bend in a back end of the first individual part, and welding the first and the second individual parts to one another such that the at least one mounting point of the second individual part is supported by the bend in the back end of the first individual part.

7. The method according to claim 6, further comprising making at least one of a strength and a hardness of the first individual part lower in an area of a weld seam than in press-hardened areas.

8. A method of producing a chassis component for a motor vehicle, the method comprising:

producing a first individual part from a sheet metal during a non-machining deformation process by press hardening;

producing an opening in a front end of the first individual part for receiving either a ball head or an axle journal, and producing a bend in a back end of the first individual part;

producing a second individual part by a production process without press hardening;

producing a mounting point in a free end of the second individual part for receiving a rubber mounting; and connecting at least the first individual part with the second individual part to form the chassis component such that the mounting point in the free end of the second individual part is supported against the bend in the back end of the first individual part and an opposite end of the second individual part is supported at the front end of the first individual part.

* * * * *